United States Patent
Mudhar et al.

(10) Patent No.: US 7,535,914 B2
(45) Date of Patent: May 19, 2009

(54) COMMUNICATIONS NETWORK (75) Inventors: Parminder S Mudhar, Felixstowe (GB); Alan W O'Neill, Ipswich (GB)

(73) Assignee: British Telecommunications plc, London (GB)

(*) Notice: Subject to any disclaimer, the term of this patent is extended or adjusted under 35 U.S.C. 154(b) by 682 days.

(21) Appl. No.: 10/149,083

(22) PCT Filed: Jan. 10, 2001

(86) PCT No.: PCT/GB01/00092

§ 371 (c)(1),
(2), (4) Date: Jun. 10, 2002

(87) PCT Pub. No.: WO01/52482

PCT Pub. Date: Jul. 19, 2001

(65) Prior Publication Data

US 2003/0076854 A1 Apr. 24, 2003

(30) Foreign Application Priority Data

Jan. 10, 2000 (EP) .................................. 00300111

(51) Int. Cl.
*H04L 12/56* (2006.01)
*H04L 12/28* (2006.01)
*H04J 3/24* (2006.01)
*G06F 15/16* (2006.01)

(52) U.S. Cl. ................... 370/408; 370/392; 370/409; 370/475; 709/245

(58) Field of Classification Search ............. 370/390, 370/392, 432, 395.52–4
See application file for complete search history.

(56) References Cited

U.S. PATENT DOCUMENTS

| 4,740,954 | A | * | 4/1988 | Cotton et al. | 370/408 |
| 5,361,256 | A | * | 11/1994 | Doeringer et al. | 370/390 |
| 5,608,726 | A | * | 3/1997 | Virgile | 370/401 |
| 5,910,955 | A | | 6/1999 | Nishimura et al. | |
| 6,101,188 | A | * | 8/2000 | Sekine et al. | 370/401 |
| 6,167,051 | A | * | 12/2000 | Nagami et al. | 370/397 |
| 6,182,147 | B1 | * | 1/2001 | Farinacci | 709/238 |
| 6,317,434 | B1 | * | 11/2001 | Deng | 370/432 |

(Continued)

FOREIGN PATENT DOCUMENTS

WO    WO 98/02821    1/1998

OTHER PUBLICATIONS

Le Faucheur, "IETF Multiprotocol Label Switching (MPLS) Architecture", IEEE International Conference on ATM, XX, XX, Jun. 22, 1998, pp. 6-15, XP002115225.

(Continued)

*Primary Examiner*—Chi H Pham
*Assistant Examiner*—Warner Wong
(74) *Attorney, Agent, or Firm*—Nixon & Vanderhye PC (57) ABSTRACT A datagram network is operated by placing a group address in the source address field of the datagram. Nodes within the datagram network forward the datagram in dependence on the contents of the source address field. This provides many of the scalability advantages offered by Multiprotocol Label Switched (MPLS) networks without introducing the overheads caused by connection set-up in MPLS networks. The method can also easily provide different quality of service levels to different types of packets and is especially useful in providing Virtual Private Networks across a shared internetwork such as the public Internet.

10 Claims, 10 Drawing Sheets

U.S. PATENT DOCUMENTS

| | | | | |
|---|---|---|---|---|
| 6,331,983 | B1* | 12/2001 | Haggerty et al. | 370/400 |
| 6,389,453 | B1* | 5/2002 | Willis | 709/204 |
| 6,396,814 | B1* | 5/2002 | Iwamura et al. | 370/256 |
| 6,501,754 | B1* | 12/2002 | Ohba et al. | 370/389 |
| 6,539,000 | B1* | 3/2003 | Murai et al. | 370/260 |
| 6,633,579 | B1* | 10/2003 | Tedijanto et al. | 370/432 |
| 6,633,866 | B2* | 10/2003 | Kishigami | 707/3 |
| 6,754,211 | B1* | 6/2004 | Brown | 370/389 |
| 6,763,000 | B1* | 7/2004 | Walsh | 370/252 |
| 6,822,964 | B1* | 11/2004 | Droz et al. | 370/395.3 |
| 7,301,945 | B1* | 11/2007 | Ooms et al. | 370/390 |
| 2002/0029288 | A1* | 3/2002 | Dobbins et al. | 709/238 |
| 2006/0146823 | A1* | 7/2006 | Ding | 370/390 |

OTHER PUBLICATIONS

Callon et al, "A framework for Multiprotocol Label Switching", available at http://www.ietf.cnri.reston.va.us/internet-drafts/draft-ietf-mpls-framework-02.txt, Apr. 1999.

Davie et al, "Use of Label Switching With RSVP", available at http://www.ietf.cnri.reston.va.us/internet-draft-ietf-mpls-rsvp-00.txt, Apr. 1999.

Deering et al, Multicast Routing in Datagram Internetworks and Extended LANs', ACM Transactions on Computer Systems, vol. 8, My 1990, No. 2, New York, US.

Rosen et al, "Multiprotocol Label Switching Architecture", available at http://www.ietf.cntri.reston.va.us/internet-drafts/draft-ietf-mpls-arch-04.txt, Apr. 1999.

Egevang et al, The IP Network Address Translator (NAT), RFC 1631, May 1994.

Wen et al, "Integrating Concast and Multicast Communication Models", Proceedings of SPIE's International Syposium on Voice, Video, and Data Communications, Boston, Mass. Nov. 2-4, 1998.

Internet Engineering Task Force's Request for Comments No. 988, "Host Extensions for IP Multicasting", Jul. 1986.

Deering et al., Network Working Group, Request for Comments: 966, Dec. 1985, http://www.ietf.org/rfc/rfc0966.txt?number=966.

Deering et al., Network Working Group, Request for Comments: 1112, Aug. 1989, http://www.ietf.org/rfc/rvc1112.txt?number=1112.

Deering et al., Network Working Group, Request for Comments: 988, Jul. 1986, http://www.ietf.org/rfc/rfc0988.txt?number=988.

IEEE Standards for Local and Metroplitan Area Networks: Virtual Bridged Local Area Networks, approved Dec. 8, 1998, IEEE STD 802.1Q-1998.

Guillermo Rigotti, "Reversed Multicast (RVM)," Internet Engineering Task Force, Internet Draft (May 1999).

Carmelo Zaccone, et al., "Framework for the transport of the Internet traffic in a privately addressed network," submitted to NAT Working Group, Internet Draft (Jun. 15, 1999).

William C. Fenner, et al., "A 'traceroute' facility for IP Multicast," Internet Engineering Task Force, Inter-Domain Multicast Routing Working Group, Internet Draft (Feb. 26, 1999).

* cited by examiner

| Version | | Type of Service | Total Length | |
|---|---|---|---|---|
| Identification | | | | |
| Time to Live | | Protocol | Header Checksum | |
| [Source Address = ] | | | 172.16.0.1 | |
| [Destination Address = ] | | | 235.255.255.255 | |
| Options | | | | |
| Payload | | | | |

Figure 5A

| Version | | Type of Service | Total Length | |
|---|---|---|---|---|
| Identification | | | | |
| Time to Live | | Protocol | Header Checksum | |
| [Source Address = ] 194.10.1.1 | | | | |
| [Destination Address =] 230.10.10.1 | | | | |
| Version | | Type of Service | Total Length | |
| Identification | | | | |
| Time to Live | | Protocol | Header Checksum | |
| [Source Address = ] 172.16.0.2 | | | | |
| [Destination Address =] 235.255.255.255 | | | | |
| Options | | | | |
| Payload | | | | |

Figure 5B

| Version | | Type of Service | | Total Length |
|---|---|---|---|---|
| Identification | | | | |
| Time to Live | | Protocol | | Header Checksum |
| [Source Address = ] 172.21.0.3 | | | | |
| [Destination Address =] 172.16.0.2 | | | | |
| Options | | | | |
| Payload | | | | |

Figure 5C

| Version | | Type of Service | Total Length | |
|---|---|---|---|---|
| Identification | | | | |
| Time to Live | | Protocol | Header Checksum | |
| [Source Address = ]  230.10.10.1 | | | | |
| [Destination Address =]  194.10.1.1 | | | | |
| Version | | Type of Service | Total Length | |
| Identification | | | | |
| Time to Live | | Protocol | Header Checksum | |
| [Source Address = ] 172.21.0.3 | | | | |
| [Destination Address =]  172.16.0.2 | | | | |
| Options | | | | |
| Payload | | | | |

COMMUNICATIONS NETWORK

This application is the US national phase of international application PCT/GB01/00092 filed 10 Jan. 2001 which designated the U.S.

BACKGROUND

1. Technical Field

The present invention relates to a method of operating a datagram network.

2. Related Art

In recent decades, packet networks (i.e. networks that break a message up into separate parts) have become popular since they allow an efficient sharing of network resources between different users. The Internet is an example of one species of packet network, namely datagram networks (i.e. networks in which packets include a destination address unique to that network).

In his paper, 'IETF Multiprotocol Label Switching (MPLS) Architecture', presented at the $1^{st}$ IEEE International Conference on ATM in June 1998, Francois Le Facheur describes an MPLS network. MPLS technology is likely to be widely implemented within the so-called backbone networks of the Internet. MPLS is one form of label switched network. In such a network, a label of only local significance is used by each node in determining how to forward a packet. An advantage of a label switched network over a datagram network is that a common label can be assigned to packets belonging to different messages. Packets having similar labels are processed uniformly. That results in a reduction in the amount of processing carried out by nodes within the label-switched network.

It is possible to achieve the same benefit in situations where a group of senders send packets to a single receiver (as might happen when a MPLS network operator provides a Virtual Private Network, for example). In that case, at each node in the network where flows from different senders converge, packets are received with different labels but forwarded with the same label. All packets being sent across the VPN therefore arrive at the sender with the same label. It will be realised that this aggregation leads to the processing burden placed on nodes near the receiver being lessened.

In their paper 'Concast: Design and Implementation of a New Network Service' available from the Proceedings of the $7^{th}$ Annual International Conference on Network Protocols (October/November 1999), Kenneth L. Calvert et al, propose a method of many-to-one communication for use in the Internet. The aim of the method is to discard copies of a packet already sent to the receiver by another sender in the group. It will be seen that, as with many-to-one communications in an MPLS network, this reduces the burden on nodes closer to the receiver.

BRIEF SUMMARY

According to a first aspect of the present invention, there is provided a method of operating a datagram network comprising at least three nodes having respective external links to a subnetwork, said datagrams being constructed in accordance with a protocol that specifies a first set of predetermined locations in said datagram to represent a source address, said method comprising:

operating each of a group of two or more of said nodes as a sender node to transmit one or more datagrams with a common group identifier in said first set of predetermined locations to one of said nodes which is operating as a recipient node, the transmission taking place via: the sender node's external link to the subnetwork, the subnetwork, and the recipient node's external link to said subnetwork; and operating said subnetwork to forward said datagram across said subnetwork in a manner dependent upon said common group identifier value in said first set of predetermined locations.

By using the source address field of the datagram for group identification, the capacity of the datagram network is used efficiently (since the size of the header of the datagram is not increased as it would be by a separate indication of group membership in the datagram). Furthermore, operating the datagram network to forward datagrams in a manner dependent on the group identifier, results in a reduction in the processing load placed on the datagram network.

It is to be understood that the subnetwork may contain any number of switching elements interconnected via internal links (and not all the switching elements need be connected directly to one another). In particular, the subnetwork may comprise a single switching element.

Preferably, said subnetwork operating step comprises operating said subnetwork to forward said datagram over the external link leading to a recipient node selected in dependence upon said common group identifier value in said first set of predetermined locations. Routing the datagram in dependence upon the common group identifier reduces the processing load placed on the subnetwork.

In preferred embodiments, said subnetwork includes, for each of said groups, stored data representing one or more routing trees associated with said group, said stored data comprising, for each routing tree, routing tree data identifying one of said external links as a root-bound external link in relation to said routing tree and a plurality of others of said external links as leaf-bound external links in relation to said routing tree; furthermore datagrams having a common group identifier are forwarded over the external link defined as the root-bound external link in relation to the routing tree that corresponds to the group identifier value in said first set of predetermined locations in those datagrams; and said protocol further defines a second set of predetermined locations to represent a destination address, said method further comprising:

operating one of said nodes to send one or more datagrams with said common group identifier in said second set of predetermined locations; and operating said subnetwork, on receipt of a datagram with said common group identifier in said second set of predetermined locations, to forward said datagram over the leaf-bound external links associated with said routing tree for said group.

In this way the same data can be used both for routing datagrams from a selected node of a group to all the other nodes in a group and for routing from any one of the other nodes to the selected node. This results in further savings in the storage and processing burdens placed on the switching elements of the subnetwork. Note that this is achieved without any increase in the size of the datagram header. Many multicast routing algorithms are known (e.g. Distance Vector Multicast Routing Protocol (DVMRP), Multicast extensions to Open Shortest Path First (MOSPF)), which can be used to generate the tree-defining data. Furthermore, a capability for handling datagrams having a group identifier in their source address field need only be provided in specialised nodes which are also capable of handling multicast datagrams.

Further preferably, said datagram forwarding step further comprises:

identifying those external links defined as leaf-bound external links in relation to the common group identifier value in said first set of predetermined locations; and discarding said data block if it was not received over one of said leaf-bound external links.

This prevents the subnetwork forwarding a datagram that falsely purports to have been sent by a member of the group.

In some embodiments, said subnetwork operating step comprises forwarding said datagram across said subnetwork with a priority which is dependent on said common group identifier.

In preferred embodiments, said method further comprises the steps of:

operating said sending node to append a common group identifier value to a received data block before sending the datagram thus formed to said recipient node, said common group identifier value being appended so as to be located in said first set of predetermined locations;

operating said recipient node to remove the common group identifier value before onward transmission of the data block.

Those skilled in the art will recognise that this embodiment involves 'tunnelling' a datagram across the subnetwork. The tunnel thus formed is a multipoint-to-point tunnel. Tunnelling has a number of advantages. Firstly, the header information present in the datagram before the common group identifier was appended can be re-used at the recipient node and in any network beyond that node. This may be used to provide a Virtual Private Network which uses a shared subnetwork. The original header information can be encrypted without affecting the operation of the subnetwork, thereby providing security for the communication between the sender and the recipient.

BRIEF DESCRIPTION OF THE DRAWINGS

There now follows a description of specific embodiments of the present invention. These embodiments are described by way of example only with reference to the accompanying drawings, in which.

DETAILED DESCRIPTION OF EXEMPLARY EMBODIMENTS

Figure 1:
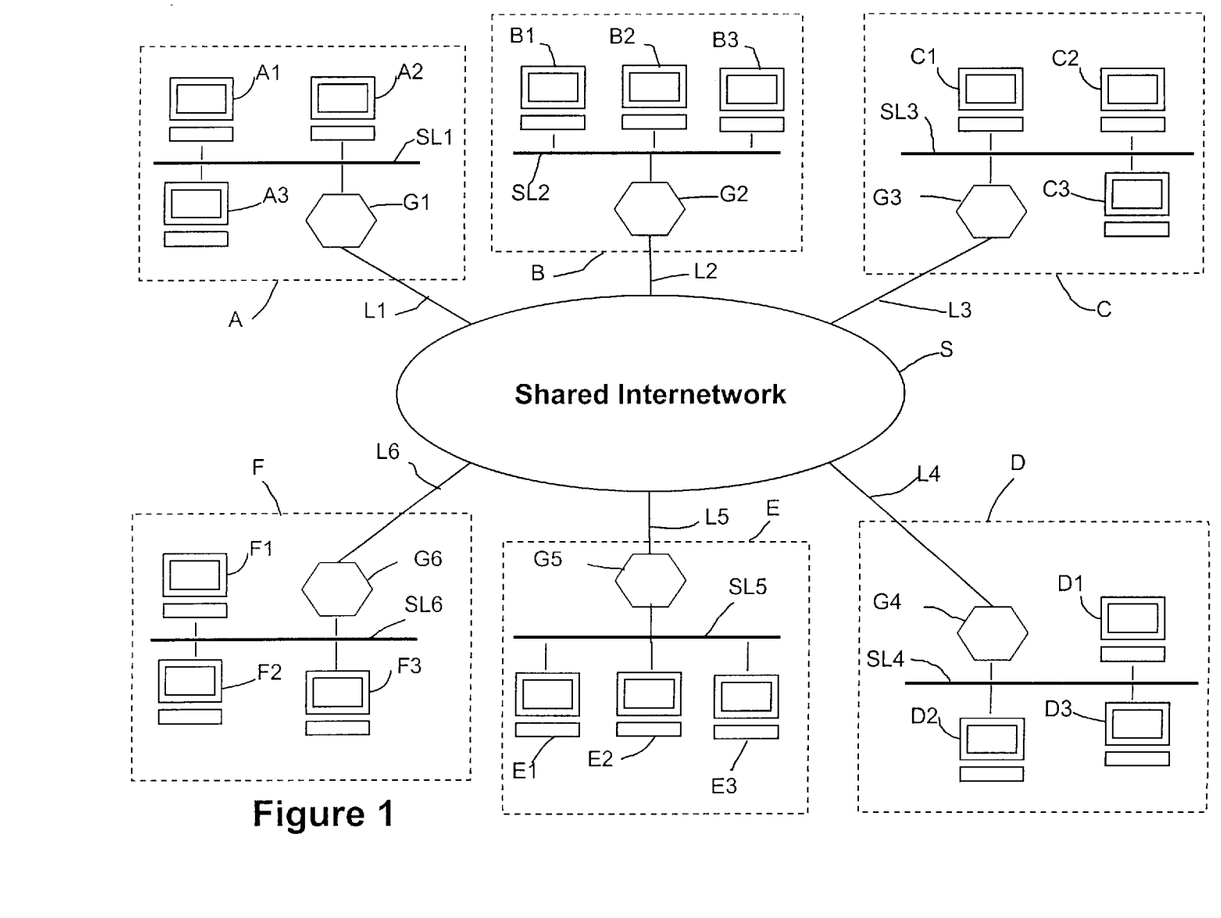
FIG. 1 is an illustration of an internetwork operating in accordance with a first embodiment of the present invention to interconnect a number of Local Area Networks (LANs)

FIG. 1 shows a shared internetwork S which interconnects six Local Area Networks (A to F). The six LANs (A to F) are connected to the shared internetwork S via six respective links (L1 to L6). Each LAN (A to F) comprises a number of computers connected to one another and to a gateway computer (G1 to G6) by a broadcast network (SL1 to SL6). Broadly, the shared internetwork S and Local Area Networks (A to F) operate in accordance with the IP protocol suite.

Figure 2:
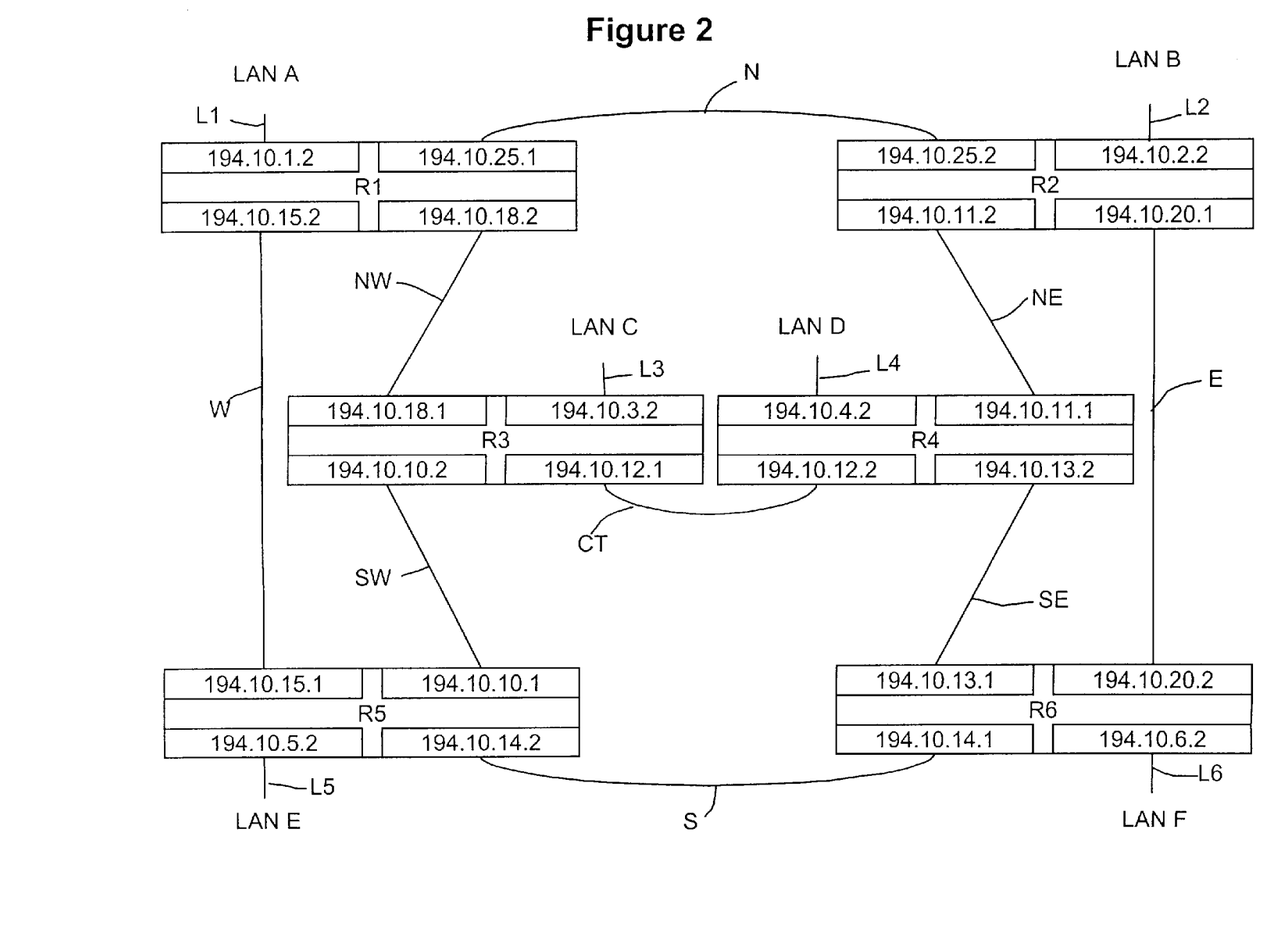
FIG. 2 is a more detailed illustration of the internetwork of FIG. 1.

The computers A1 to F3, the gateway computers G1 to G6, and the routers that operate in the shared internetwork S (FIG. 2: R1 to R6) are all types of nodes. In accordance with the IP protocol suite, each interface between a node and a network link is associated with a unique 4-byte address. These 4-byte addresses are normally written as four decimal digits each of which represent the decimal value of a respective byte—for example the address associated with the interface between the computer A1 and the shared link SL1, might be 172.16.0.2. One possible configuration of IP addresses for the LANs of FIG. 1 is given in Table 1 below:

TABLE 1

| Interface | IP address | Interface | IP address | Interface | IP address |
|---|---|---|---|---|---|
| A1 to SL1 | 172.16.0.1 | B1 to SL2 | 172.17.0.1 | C1 to SL3 | 172.18.0.1 |
| A2 to SL1 | 172.16.0.2 | B2 to SL2 | 172.17.0.2 | C2 to SL3 | 172.18.0.2 |
| A3 to SL1 | 172.16.0.3 | B3 to SL2 | 172.17.0.3 | C3 to SL3 | 172.18.0.3 |
| G1 to SL1 | 172.16.0.4 | G2 to SL2 | 172.17.0.4 | G3 to SL3 | 172.18.0.4 |
| G1 to L1 | 194.10.2.1 | G2 to L2 | 194.10.3.1 | G3 to L3 | 194.10.4.1 |
| D1 to SL4 | 172.19.0.1 | E1 to SL5 | 172.20.0.1 | F1 to SL6 | 172.21.0.1 |
| D2 to SL4 | 172.19.0.2 | E2 to SL5 | 172.20.0.2 | F2 to SL6 | 172.21.0.2 |
| D3 to SL4 | 172.19.0.3 | E3 to SL5 | 172.20.0.3 | F3 to SL6 | 172.21.0.3 |
| G4 to SL4 | 172.19.0.4 | G5 to SL5 | 172.20.0.4 | G6 to SL6 | 172.21.0.4 |
| G4 to L4 | 194.10.6.1 | G5 to L5 | 194.10.7.1 | GG to L6 | 194.10.9.1 |

Those skilled in the art will recognise that the IP addresses assigned to the interfaces within the LANs (A to F) are private IP addresses. Packets having private IP addresses in their destination address field are not forwarded by routers in the public Internet (and, in the present example, are not forwarded across the shared internetwork S). In contrast, the addresses assigned to the interfaces between the gateway computers (G1 to G6) and the links (L1 to L6) leading to the shared internetwork are public IP addresses.

A more detailed diagram of the shared internetwork S is given in FIG. 2. The internetwork S comprises six routers (R1 to R6), each of which has four physical communication ports. One of the communication ports of each router (R1 to R6) receives a link (L1 to L6) to a respective one of the Local Area Networks (A to F). The other three communication ports receive links to respective other routers.

In more detail, a western central router R3 is directly connected via a central link CT to an eastern central router R4 and also to a north-western router R1 and south-western router R5 via a north-western link NW and south-western link SW respectively. Similarly the eastern central router R4 is directly connected to a north-eastern router R2 and a south-eastern router R6 via a north-eastern link NE and a south-eastern link SE respectively. A northern link N directly connects the north-eastern R1 and north-western R2 routers. An eastern link E directly connects the north-eastern R2 and south-eastern R6 routers. A western link W directly connects the north-western R1 and south-western R5 routers. Finally, a southern link S directly connects the south-western R5 and south-eastern R6 routers.

A possible configuration of the IP addresses for the interfaces between the internetwork nodes of the internetwork S and the links (L1 to L6, N, S, E, W, NE, SE, SW, NW, CT) is given in Table 2 below:

TABLE 2

| Interface | IP Address |
| --- | --- |
| R1 to L1 | 194.10.1.2 |
| R1 to N | 194.10.25.1 |
| R1 to NW | 194.10.18.2 |
| R1 to W | 194.10.15.2 |
| R2 to L2 | 194.10.2.2 |
| R2 to N | 194.10.25.2 |
| R2 to NE | 194.10.11.2 |
| R2 to E | 194.10.20.1 |
| R3 to L3 | 194.10.3.2 |
| R3 to CT | 194.10.12.1 |
| R3 to NW | 194.10.18.1 |
| R3 to SW | 194.10.10.2 |
| R4 to L4 | 194.10.4.2 |
| R4 to CT | 194.10.12.2 |
| R4 to NE | 194.10.11.1 |
| R4 to SE | 194.10.13.2 |
| R5 to L5 | 194.10.5.2 |
| R5 to W | 194.10.25.1 |
| R5 to SW | 194.10.10.1 |
| R5 to S | 194.10.14.2 |
| R6 to L6 | 194.10.6.2 |
| R6 to E | 194.10.20.2 |
| R6 to SE | 194.10.13.1 |
| R6 to S | 194.10.14.1 |

Those skilled in the art will see that a Class C address has been assigned to each link (L1 to L6, N, S, E, W, NE, SE, SW, NW, CT). The links in this case are provided by Permanent Virtual Circuits set up in an Asynchronous Transfer Mode network that provides the shared internetwork S.

Each of the gateway computers (G1 to G6) and the routers (R1 to R6) operates in accordance with the Open Shortest Path First dynamic routing process (defined in Request For Comments (RFC) 1247 available from the Internet Engineering Task Force (IETF)—contactable at 11150 Sunset Hills Road, Suite 100, Reston, Va. 20190-5321, USA). Hence, each router (R1 to R6) generates a unicast routing table which indicates which of the router's interfaces provides the best route towards any reachable network. An example of such a routing table is given for the north-eastern router R2 in Table 3 below:

TABLE 3

| Destination Address | Best Output Interface |
| --- | --- |
| 172.16.x.x [i.e. LAN A] | 194.10.25.2 |
| 172.17.x.x [i.e. LAN B] | 194.10.2.2 |
| 172.18.x.x [i.e. LAN C] | 194.10.25.2 |
| 172.20.x.x [i.e. LAN D] | 194.10.11.2 |

TABLE 3-continued

| Destination Address | Best Output Interface |
| --- | --- |
| 172.21.x.x [i.e. LAN E] | 194.10.25.2 |
| 172.22.x.x [i.e. LAN F] | 194.10.20.1 |

Comparison with Table 1 will show how each of the entries on the left-hand side of Table 3 refers to one of the Local Area Networks (A to F). (Note that the information in square brackets is not actually stored in the router—it is included for the convenience of the reader). The right-hand column of Table 3 indicates from which interface of the north-eastern router R2 a packet with a destination address listed in the left-hand column is to be sent.

Both the gateway computers (G1 to G6) and the routers (R1 to R6) operate in accordance with the Distance Vector Multicast Routing Protocol (defined in RFC 1075 available from the IETF). This results in each router (R1 to R6) further storing a multicast routing table which lists for each multicast group that is routed via that router:

for each computer in the multicast group that may act as a source node:

i) an indication of the interface through which packets addressed to that multicast group should be received; and ii) an indication of the interface(s) through which multicast packets addressed to that multicast group are to be forwarded.

By way of example, assume the operator of the shared internetwork S provides a Virtual Private Network (VPN) that interconnects LANs A,B,D and F (this might be required where those LANs belong to the same organisation).

To provide the VPN the network operator firstly configures gateway computers G1, G2, G4 and G6 to be members of a multicast group associated with an IP address, say 230.10.10.1. Each of the elements of the shared internetwork S then operate in accordance with the DVMRP algorithm to generate entries relating to that multicast group in their multicast routing tables. The multicast routing table entry stored in the north-eastern router R2 might then appear as shown in Table 4 below:

TABLE 4

| Source Address | Destination Address | Best Input Interface | Output Interfaces |
| --- | --- | --- | --- |
| 194.10.1.1 [i.e. G1] | 230.10.10.1 [i.e. G1, G2, G4, &G6] | 194.10.25.2 | 194.10.2.2 194.10.11.2 194.10.20.1 |
| 194.10.2.1 [i.e. G2] | 230.10.10.1 [i.e. G1, G2, G4, &G6] | 194.10.2.2 | 194.10.25.2 194.10.11.2 194.10.20.1 |
| 194.10.4.1 [i.e. G4] | 230.10.10.1 [i.e. G1, G2, G4, &G6] | 194.10.11.2 | 194.10.25.2 194.10.2.2 194.10.20.1 |
| 194.10.6.1 [i.e. G6] | 230.10.10.1 [i.e. G1, G2, G4, &G6] | 194.10.20.1 | 194.10.25.2 194.10.2.2 194.10.11.2 |

The internetwork operator also configures each of the computers in the LANs A,B,D and F to address packets intended for one or more computers in all those LANs to multicast address 235.255.255.255.

The internetwork operator then places configuration data in the gateway computers G1, G2, G4 and G6. That configuration data associates destination addresses with tunnel data—the tunnel data at G1, for example, might be as follows:

TABLE 5

| Contents of Destination Address Field of packet from LAN A | Source Address of packet for onward transmission across shared internetwork S | Destination Address of packet for onward transmission across shared internetwork S |
| --- | --- | --- |
| 172.17.x.x [i.e. LAN B] | 230.10.10.1 | 194.10.2.1 |
| 172.19.x.x [i.e. LAN D] | 230.10.10.1 | 194.10.4.1 |
| 172.21.x.x [i.e. LAN F] | 230.10.10.1 | 194.10.6.1 |
| 235.255.255.255 | 194.10.1.1 | 230.10.10.1 |

Figure 3:
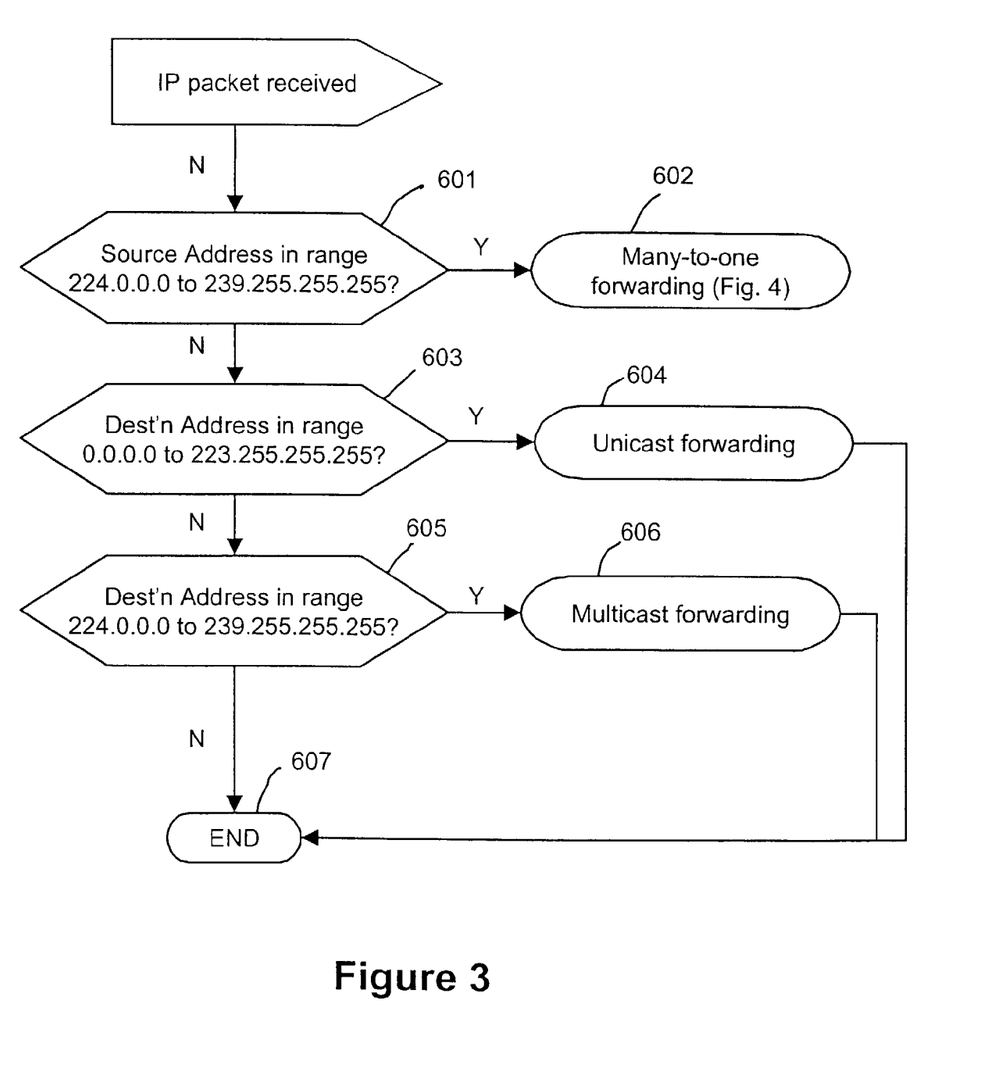
FIG. 3 is a flow-chart which shows how a router of the internetwork of FIG. 2 operates in accordance with the first embodiment.

In accordance with the first embodiment, a router (R1 to R6) is programmed to carry out the processes illustrated in FIG. 3 on receiving an IP packet. It is to be understood that the flow-chart shows the processes only to the extent required to explain the present embodiment—processes that are carried out in conventional routers (such as header verification and error checking) are also carried out in the present embodiment but not discussed here.

Firstly, if the source address field of the received packet is in the range 224.0.0.0 to 239.255.255.255 (step 601) then a many-to-one forwarding process (step 602) is carried out (explained in more detail below in relation to FIG. 4). If the source address is not in that range then, if the destination address contained within the received packet is in the range 0.0.0.0 to 223.255.255.255 (step 603) the router carries out conventional unicast forwarding (step 604) based on the destination address and its unicast routing table (Table 3). After unicast forwarding (step 604) the process ends (step 607). If the destination address contained within the received packet is instead in the range 224.0.0.0 to 239.255.255.255 (step 605) the router carries out conventional multicast forwarding (step 606) based on the destination address and its multicast routing table (Table 4). After multicast forwarding (step 606) the process ends (step 607). Also, if neither the source address nor the destination address is within the above ranges then the process ends (step 607).

Figure 4:
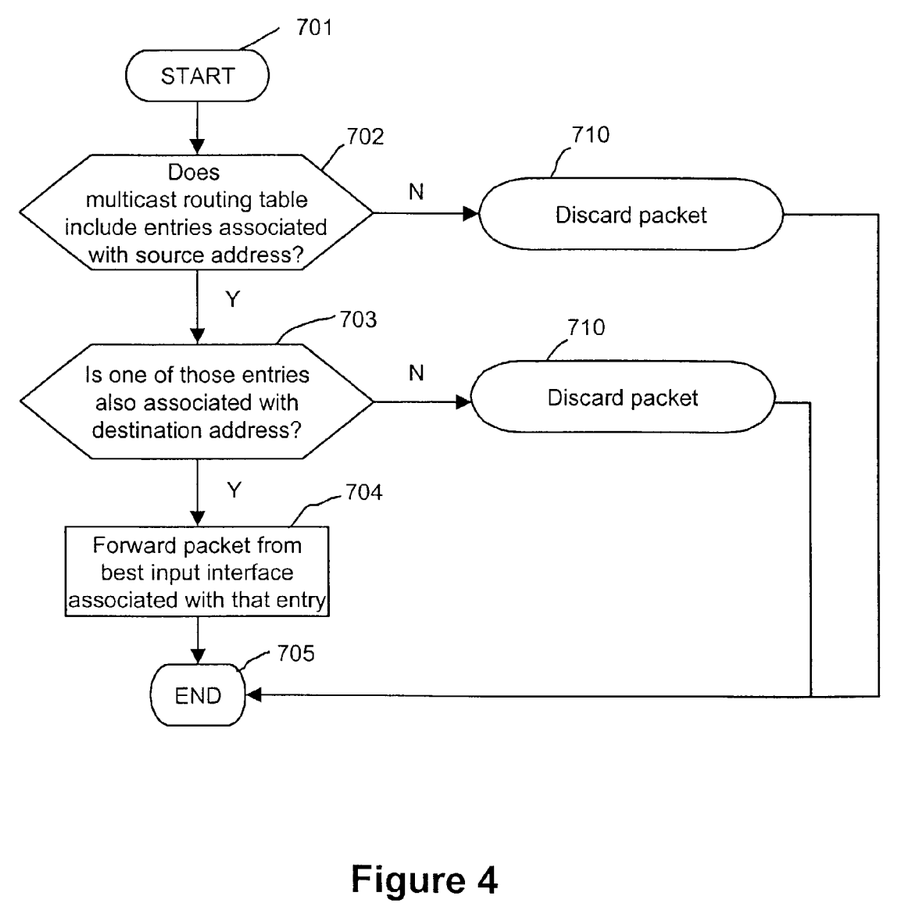
FIG. 4 is a flow-chart which shows part of the operation of FIG. 3 in more detail.

As shown in FIG. 4, the many-to-one forwarding (step 602) starts at step 701. Firstly, the multicast routing table is searched for an entry for a multicast group (i.e. the second column of Table 4 is searched) having the same address as the source address contained within the received packet (step 702). If a matching entry in the multicast routing table (Table 4) is not found, then the packet is discarded (step 710) before the many-to-one forwarding process ends (step 705).

If one or more entries corresponding to the multicast address contained within the source address field of the received packet are found in step 702 then a search is carried out for an entry which also has a source address which corresponds to the destination address in the received packet (i.e. the first column of Table 4 is searched). Again, if no such entry is found, then the packet is discarded (step 710). If such an entry is found, then the received packet is forwarded (step 704) from the interface listed as the best input interface in that entry (i.e. the interface listed in the third column of Table 4). The many-to-one forwarding process then ends (step 705).

An example of the operation of first embodiment will now be given. In this example, the network has been configured as explained above and as illustrated in the accompanying diagrams and tables.

Figure 5A:
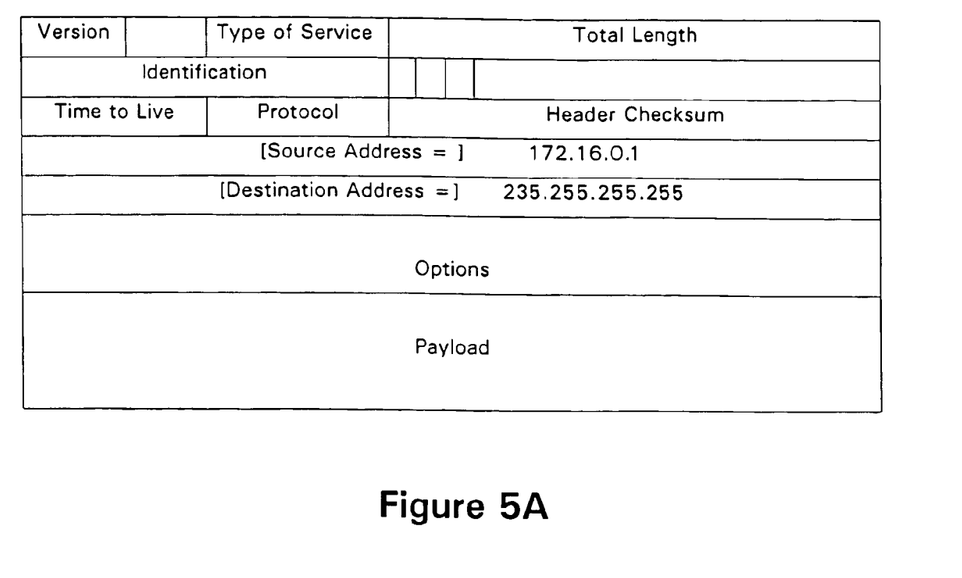
FIG. 5A shows the format of a multicast IP packet sent by a computer on one of the LANs of FIG. 1 to a computers on a selection of the other LANs.

A user of the computer A1 instructs it to send an IP packet to computers B1, D1 and F1 Following its configuration, the computer A1 then sends a packet having a source address field which gives the IP address associated with the interface between A1 and the shared link SL1 (i.e. 172.16.0.1) and a destination address field 235.255.255.255. The packet is shown in FIG. 5A.

Figure 5B:
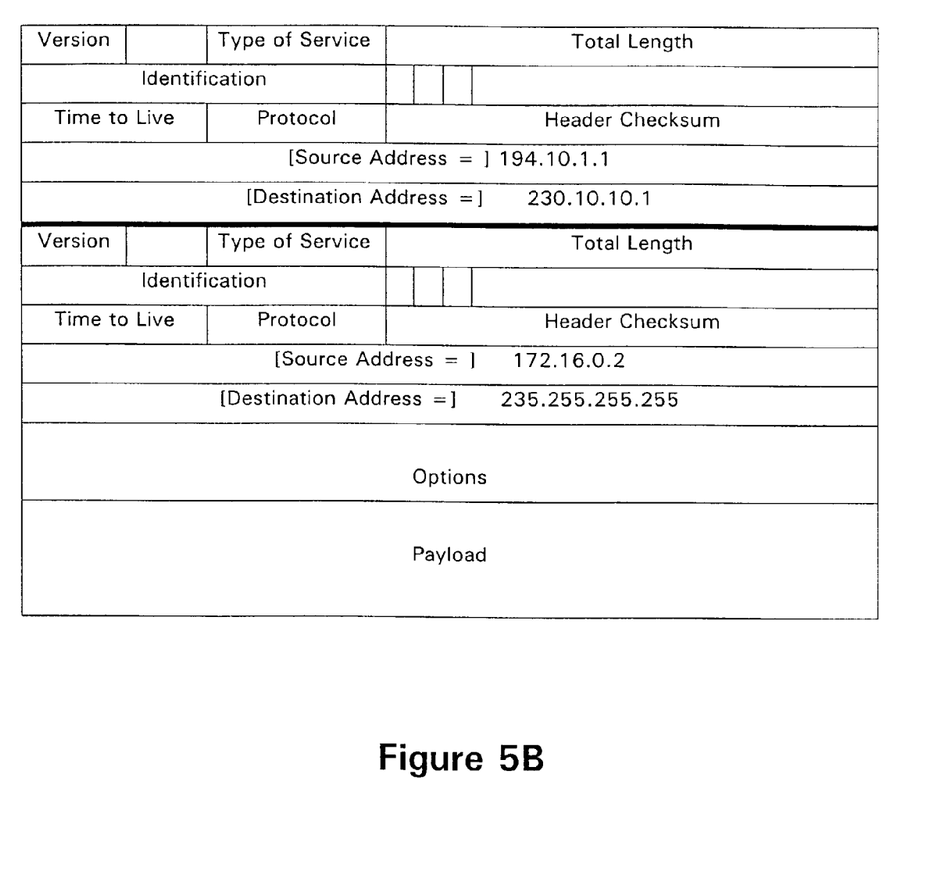
FIG. 5B shows the format of a multicast tunnel packet which is used in transmitting the packet of FIG. 5A across the internetwork of FIG. 2.

This packet is received by the gateway computer G1 which notes that the destination address is one of those to be tunnelled (from Table 5) and therefore appends a header to the packet to create a tunnel packet. The tunnel packet uses the multicast address associated with the VPN and is illustrated in FIG. 5B.

Figure 6A:
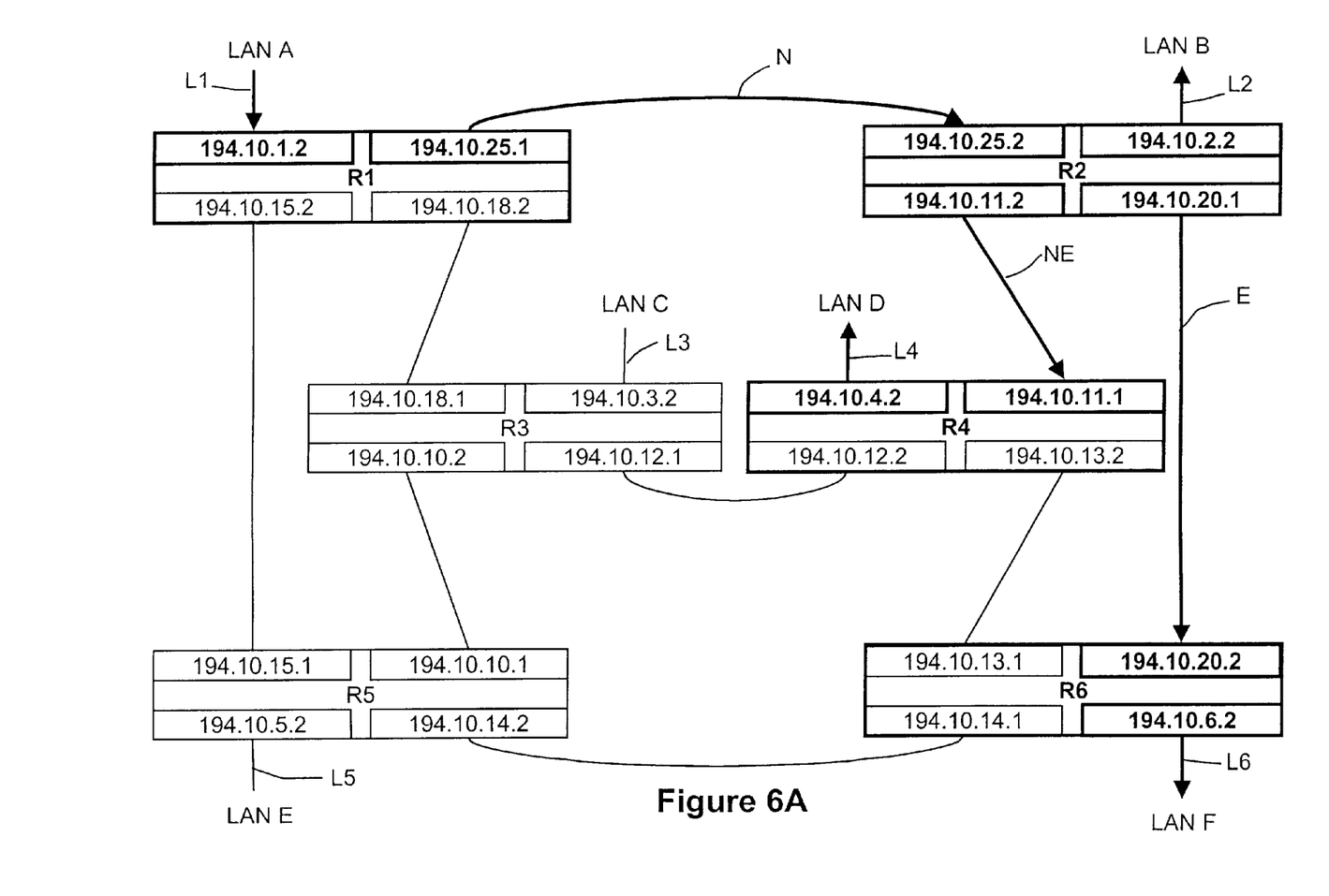
FIG. 6A illustrates a routing tree for a one-to-many communication.

The gateway computer then sends the tunnel packet over link L1 to the shared internetwork S. Since the source address is not in the range 224.0.0.0 to 239.255.255.255 and the destination address is in the range 224.0.0.0 to 239.255.255.255, each of the routers carries out conventional multicast forwarding (step 606 in FIG. 3). The shared internetwork thus multicasts the packet in a conventional manner to the recipient LANs B, D and F. A routing tree showing how the routers of the network would forward the packet is illustrated in FIG. 6A. The header of the tunnel packet is then removed at each of the recipient LANs (B, D, and F) and the packets forwarded to the destination computers in a conventional manner.

Figure 5C:
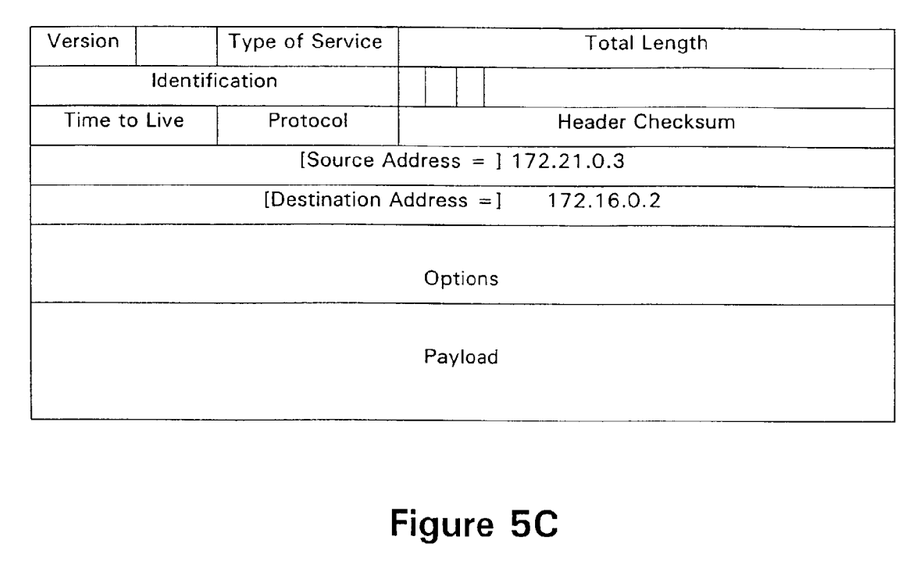
FIG. 5C shows the format of a unicast IP packet sent by a computer on one of the LANs that receives the packet of FIG. 5A back towards the LAN from which the packet of FIG. 5A was sent.

To continue the example, a user of computer F3 on LAN F might instruct that computer to send a packet to computer A1 on LAN A. The packet sent by computer F3 onto LAN F has a conventional format as shown in FIG. 5C.

Figure 5D:
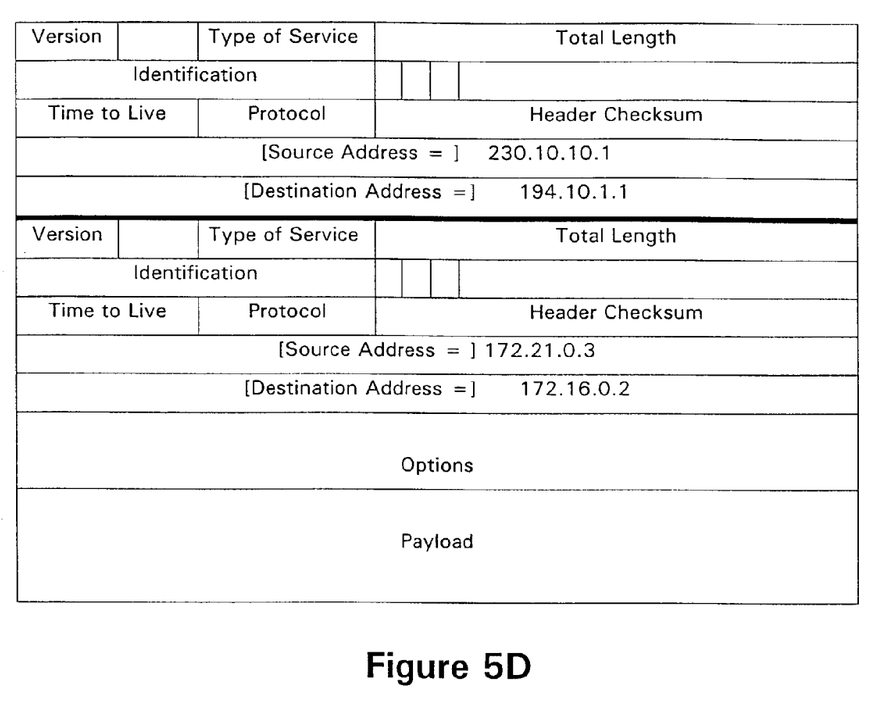
FIG. 5D shows the format of a many-to-one tunnel packet which is used in transmitting the packet of FIG. 5C across the internetwork of FIG. 2.

On receipt of the packet at the gateway computer G1, the gateway computer looks up a Table equivalent to Table 5 above forms a tunnel packet containing the packet sent from computer F3. In accordance with that table, the value 230.10.10.1 is placed in the source address field of the tunnel packet, and the value 194.10.1.1 is placed in the destination address field of the tunnel packet. The tunnel packet is shown in FIG. 5D.

Packets having a multicast address can be generated by running the FreeBSD operating system program on each of the gateway computers G1 to G6. Other operating systems may also be used, but any part of the program that prevents the generation of packets having a source address in the range 224.0.0.0 to 239.255.255.255 will have to be removed.

Figure 6B:
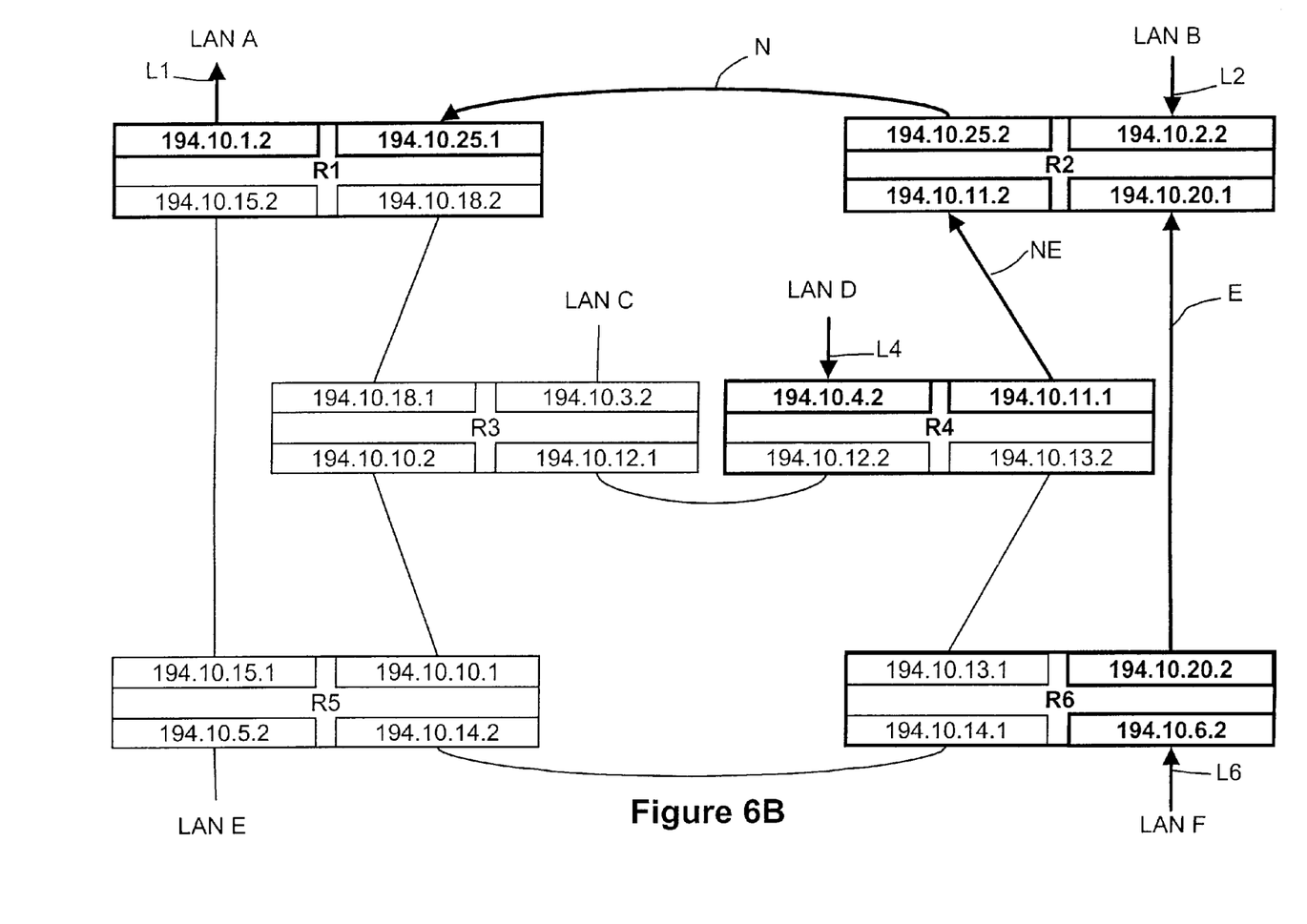
FIG. 6B illustrates a reversed version of the routing tree of FIG. 6A for use in a many-to-one communication.

Each of the routers receiving the many-to-one tunnel packet will carry out many-to-one forwarding (step 602) after finding that the source address of the many-to-one tunnel packet is in the range 224.0.0.0 to 239.255.255.255 (in step 601). The routes followed by many-to-one packets from LANs B,D, and F to LAN A are illustrated in FIG. 6B. It will be seen that the routes are the reverse of those shown in FIG. 6A and followed by multicast packets sent from LAN A.

It will be realised that both the tunnel packets mentioned above (FIGS. 5B and 5D) would be forwarded by router R2 using its multicast routing table (Table 4). It will be seen that both the many-to-one communication and the one-to-many communication use the same routing table entries. Hence, the number of routing entries that need be stored in the router R2 in order to forward packets from one of the members of the VPN to the others and from one of the members to another member, is reduced. Thus the amount of memory required at R2 is reduced as is the processing time required to search the routing table for the appropriate entry. Thus a packet forwarding technology is provided that can alleviate concerns about the ability of the core of a network to handle real-time packets.

The new forwarding mode enables computers within a multicast group to send a packet to another member of the group anonymously. This is useful in relation to remote anonymous voting and the like.

Also, routers can be set up to respond to packets of the new type by forwarding packets received from any member of selected group more quickly than those received from other sources. The use of a group source address removes the requirement for the routers of the shared internetwork S from storing and maintaining lists of which computers are present in which groups. In general, the multicast source addresses of packets of the new type can be used to provide any differentiation of service that might be provided by say, the Forward Equivalence Class to be used in proposed Multiprotocol Label Switched networks.

In a preferred embodiment, the many-to-one forwarding process (FIG. 4) includes a further input interface checking step immediately before the forwarding step 704. In the input interface checking step it is checked to see whether the packet has been received on one of the output interfaces (i.e. the fourth column of Table 4) associated with the entry found in step 703. If it was not received on one of those interfaces then the packet is discarded.

It will be seen how the preferred embodiment prevents computers on LANs which do not contain members of the multicast group from sending many-to-one packets which have the address of that multicast group in their source address field. In this way, computers which are not in the group are unable to take advantage of services intended only for group members. In order to control membership of the multicast group, methods such as those used in the Remote Authentication Dial In User Service (RADIUS) and the improvement thereof known as DIAMETER.

Although the above embodiment described the routers operating in accordance with the Distance Vector Multicast Routing Protocol (a protocol that builds so-called 'source-based trees'), it is to be understood that so-called 'shared tree' multicast routing protocols, such as Core-Based Tree might also be used.

As another variation, those skilled in the art will realise that the payload of the tunnel packet (which includes the header of the original packet) might be encrypted to provide security for the communication across the shared internetwork S.

In the above embodiment, all of the routers operated a many-to-one forwarding process. However, the embodiment is also of benefit in networks were only a subset of the routers operate such a process. That is because conventional routers will forward a packet based on its destination address, ignoring the source address field—i.e. they will not carry out steps 601 and 602 of FIG. 4.

It will be realised that the present invention could be used in relation to a number of protocols other than IP version 4 mentioned above. Clearly, it could be used in relation to IP version 6.

Further embodiments of the present invention are similar to the above-described embodiments but have area edge routers in place of the gateway computers (G1 to G6). It will be realised that such an embodiment can provide differentiated services based on an address carried in an IP packet rather than on a label that would be attached to the packet in accordance with Multiprotocol Label Switching protocols.

Although, in the above embodiment, the internetwork S was configured to use 'tunnelling' to provide sites A,B,D & F with a Virtual Private Network, many of the advantages of the present invention would still pertain were the tunnelling feature to be removed. The multicast groups would then have hosts as members and it would be necessary to use public Internet addresses within the sites A to F. Furthermore, without tunnelling, the advantages would be achieved without increasing the size of the IP packet header.

All the above embodiments described the re-use of multicast routing tables, some embodiments of the present invention might not make use of the multicast routing tables—for example, packets from A,B,D, & F could be provided with a Group E source address, the switching elements of the internetwork S operating to route the packets on the basis of that source address and a routing table that is provided at the switching elements by the network operator.

As a further alternative, routing could be carried out conventionally, but with scheduling processes being carried out in dependence on the Group E source address.

Any address value could be used In the source address field to represent the group. Group E source addresses are usefully employed since IP version 4 has not assigned any meaning to them.

What is claimed is:

1. A method a of operating a datagram network comprising at least three nodes having respective external links to a subnetwork, said datagrams being constructed in accordance with a protocol that specifies a first set of predetermined locations in said datagram to represent a source address, said method comprising:

(a) operating each of a group of two or more of said nodes as a sender node to transmit one or more datagrams with a common group identifier in said first set of predetermined locations to one of said nodes which is operating as a recipient node, the transmission taking place via the sender node's external link to said subnetwork, the subnetwork and the recipient node's external link to said subnetwork;

(b) operating said subnetwork to forward said datagram over the external link leading to a recipient node selected in dependence upon said common group identifier value in said first set of predetermined locations;

said subnetwork including, for each of said groups, stored data representing one or more routing trees associated with said group, said stored data comprising, for each routing tree, routing tree data identifying one of said external links as a root-bound external link in relation to said routing tree and a plurality of others of said external links as leaf-bound external links in relation to said routing tree;

said selected one of said external links comprising the external link defined as the root-bound external link in relation to the routing tree that corresponds to the group identifier value in said first set of predetermined locations; and said protocol further defining a second set of predetermined locations to represent a destination address;

(c) operating one of said nodes to send one or more datagrams with said common group identifier in said second set of predetermined locations; and (d) operating said subnetwork, on receipt of a datagram with said common group identifier in said second set of predetermined locations, to forward said datagram over the leaf-bound external links associated with said routing tree for said group.

2. A method as in claim 1 wherein said datagram forwarding further comprises:
identifying those external links defined as leaf-bound external links in relation to the common group identifier value in said first set of predetermined locations; and
discarding said data block if it was not received over one of said leaf-bound external links.

3. A method as in claim 1 wherein said (b) comprises forwarding said datagram across said subnetwork with a priority which is dependent on said common group identifier.

4. A method as in claim 1 further comprising:
(c) operating said sender inter-network router to append a common group identifier value to a received data block before sending the datagram thus formed to said recipient inter-network router, said common group identifier value being appended so as to be located in said first set of predetermined locations; and
(d) operating said recipient node to remove the common group identifier value before onward transmission of the data block.

5. Apparatus for operating a datagram network comprising at least three nodes having respective external links to a subnetwork, said datagrams being constructed in accordance with a protocol that specifies a first set of predetermined locations in said datagram to represent a source address, said method comprising:
(a) means for operating each of a group of two or more of said nodes as a sender node to transmit one or more datagrams with a common group identifier in said first set of predetermined locations to one of said nodes which is operating as a recipient node, the transmission taking place via the sender node's external link to the subnetwork, the subnetwork and the recipient node's external link to said subnetwork;
(b) means for operating said subnetwork to forward said datagram over the external link leading to a recipient node selected in dependence upon said common group identifier value in said first set of predetermined locations;
said subnetwork including, for each of said groups, stored data representing one or more routing trees associated with said group, said stored data comprising, for each routing tree, routing tree data identifying one of said external links as a root-bound external link in relation to said routing tree and a plurality of others of said external links as leaf-bound external links in relation to said routing tree;
said selected one of said external links comprising the external link defined as the root-bound external link in relation to the routing tree that corresponds to the group identifier value in said first set of predetermined locations; and said protocol further defining a second set of predetermined locations to represent a destination address;
(c) means for operating one of said nodes to send one or more datagrams with said common group identifier in said second set of predetermined locations; and
(d) means for operating said subnetwork, on receipt of a datagram with said common group identifier in said second set of predetermined locations, to forward said datagram over the leaf-bound external links associated with said routing tree for said group.

6. Apparatus as in claim 5 wherein said means for forwarding the datagram further comprises:
means for identifying those external links defined as leaf-bound external links in relation to the common group identifier value in said first set of predetermined locations; and
means for discarding said data block if it was not received over one of said leaf-bound external links.

7. A method of operating an inter-network comprising at least three gateway nodes having respective external links to a subnetwork, datagrams transmitted across said inter-network being constructed in accordance with an inter-networking protocol that specifies a first set of predetermined locations in said datagram to represent a source address, said method comprising:
(a) operating each of a group of two or more of said gateway nodes as a sender gateway to transmit one or more datagrams with a common group identifier in said first set of predetermined locations to one of said gateway nodes which is operating as a recipient gateway, the transmission taking place via the sender gateway's external link to said subnetwork, the subnetwork and the recipient gateway's external link to said subnetwork;
(b) operating said subnetwork to forward said datagram over the external link leading to a recipient gateway selected in dependence upon said common group identifier value in said first set of predetermined locations;
said subnetwork including, for each of said groups, stored data representing one or more routing trees associated with said group, said stored data comprising, for each routing tree, routing tree data identifying one of said external links as a root-bound external link in relation to said routing tree and a plurality of others of said external links as leaf-bound external links in relation to said routing tree;
said selected one of said external links comprising the external link defined as the root-bound external link in relation to the routing tree that corresponds to the group identifier value in said first set of predetermined locations; and
said protocol further defining a second set of predetermined locations to represent a destination address:
(c) operating one of said gateway nodes to send one or more datagrams with said common group identifier in said second set of predetermined locations; and
(d) operating said subnetwork, on receipt of a datagram with said common group identifier in said second set of predetermined locations, to forward said datagram over the leaf-bound external links associated with said routing tree for said group.

8. A method as in claim 7 wherein said datagram forwarding further comprises:
identifying those external links defined as leaf-bound external links in relation to the common group identifier value in said first set of predetermined locations; and
discarding said data block if it was not received over one of said leaf-bound external links.

9. An inter-network comprising at least three gateways, a subnetwork, and respective external links between said gateways and said subnetwork, said datagrams transmitted across said inter-network being constructed in accordance with a protocol that specifies a first set of predetermined locations in said datagram to represent a source address, wherein:
(a) each of a group of two or more of said gateway nodes is operable as a sender node to transmit one or more datagrams with a common group identifier in said first set of predetermined locations to one of said gateway nodes which is operating as a recipient gateway, the transmission taking place via the sender gateway's external link to the subnetwork, the subnetwork and the recipient gateway's external link to said subnetwork;

(b) said subnetwork is arranged in operation to forward said datagram between nodes in said subnetwork in a manner dependent upon said common group identifier value in said first set of predetermined locations and also operating said subnetwork to forward said datagram over the external link leading to a recipient gateway selected in dependence upon said common group identifier value in said first set of predetermined locations;

said subnetwork including, for each of said groups, stored data representing one or more routing trees associated with said group, said stored data comprising, for each routing tree, routing tree data identifying one of said external links as a root-bound external link in relation to said routing tree and a plurality of others of said eternal links as leaf-bound external links in relation to said routing tree;

said selected one of said external links comprising the external link defined as the root-bound external link in relation to the routing tree that corresponds to the group identifier value in said first set of predetermined locations; and said protocol further defining a second set of predetermined locations to represent a destination address;

(c) said gateway nodes are operable to send one or more datagrams with said common group identifier in said second set of predetermined locations; and (d) said subnetwork is arranged in operation, on receipt of a datagram with said common group identifier in said second set of predetermined locations, to forward said datagram over the leaf-bound external links associated with said routing tree for said group.

10. Apparatus as in claim 9 wherein said subnetwork further comprises:

means for identifying those external links defined as leaf-bound external links in relation to the common group identifier value in said first set of predetermined locations; and means for discarding said data block if it was not received over one of said leaf-bound external links.

* * * * *